United States Patent
Glimpel (10) Patent No.: US 9,724,773 B2
(45) Date of Patent: Aug. 8, 2017

(54) TOOL FOR THE CHIPLESS PRODUCTION OR FINISHING OF A THREAD ON A WORKPIECE, IN PARTICULAR COLD-FORMING TAP OR THREAD-FORMING TAP

(71) Applicant: EMUGE—Werk Richard Glimpel GmbH & Co. KG Fabrik fuer Praezisionswerkzeuge, Lauf a. d. Pegnitz (DE)

(72) Inventor: Helmut Glimpel, Pegnitz (DE)

(73) Assignee: EMUG-Werk Richard Glimpel GmbH & Co. KG Fabrik fuer Praezisionswerkzeuge, Lauf a.d. Pegnitz (DE)

( * ) Notice: Subject to any disclaimer, the term of this patent is extended or adjusted under 35 U.S.C. 154(b) by 195 days.

(21) Appl. No.: 14/374,813

(22) PCT Filed: Nov. 27, 2012

(86) PCT No.: PCT/EP2012/073683
§ 371 (c)(1),
(2) Date: Jul. 25, 2014

(87) PCT Pub. No.: WO2013/113422
PCT Pub. Date: Aug. 8, 2013

(65) Prior Publication Data
US 2015/0013415 A1    Jan. 15, 2015

(30) Foreign Application Priority Data
Jan. 30, 2012 (DE) .......... 10 2012 100 734

(51) Int. Cl.
*B23G 7/02* (2006.01)
(52) U.S. Cl.
CPC .................. *B23G 7/02* (2013.01)

(58) Field of Classification Search
CPC .... B23G 7/02; B23G 7/00; B23G 5/06; B23P 15/52; B21H 3/02
(Continued)

(56) References Cited

U.S. PATENT DOCUMENTS 5,797,710 A * 8/1998 Sawabe ................... B23G 7/02
408/215
6,685,573 B2 * 2/2004 Hikosaka ................. B23G 7/02
408/222

(Continued)

FOREIGN PATENT DOCUMENTS

| CN | 102164700 | 8/2011 |
| DE | 102005051174 | 5/2007 |

(Continued)

OTHER PUBLICATIONS

EMUGE—247-PCT-US Letter dated Jan. 27, 2016.
International Search Report for PCT/EP2012/073683 mailed Feb. 20, 2013.

Primary Examiner — Edward Moran
Assistant Examiner — Mohammad Yusuf
(74) Attorney, Agent, or Firm — Workman Nydegger (57) ABSTRACT

A tool for the chipless production of a thread on a workpiece can comprise a forming region, which is rotatable about a tool axis (A), for the chipless production of an internal thread, wherein the forming region has a plurality of pressure studs, which project radially from the tool axis (A), for producing or finishing the thread by pressing the pressure studs into the workpiece surface. In one implementation, the pressure studs are arranged successively along a shaping curve that encircles the tool axis (A) in a substantially spiral manner, and the pitch of the shaping curve corresponds substantially to the pitch of the thread to be produced. Additionally, the pitch angle (t1) between first and second pressure studs along the shaping curve differs from the pitch (Continued)

angle (t2) between the second pressure stud and a third pressure stud that follows the second pressure stud along the shaping curve.

11 Claims, 6 Drawing Sheets

(58) Field of Classification Search
USPC .................................................. 470/84, 204
See application file for complete search history.

(56) References Cited

U.S. PATENT DOCUMENTS

| | | | | |
|---|---|---|---|---|
| 2007/0207865 A1* | 9/2007 | Glimpel | ................... | B23G 5/06 |
| | | | | 470/198 |
| 2011/0020087 A1* | 1/2011 | Yamamoto | ............... | B23G 7/02 |
| | | | | 408/219 |
| 2011/0201434 A1* | 8/2011 | Edelmann | ................ | B23G 7/02 |
| | | | | 470/198 |

FOREIGN PATENT DOCUMENTS

| | | |
|---|---|---|
| DE | 102006015367 | 10/2007 |
| DE | 102008053772 | 4/2010 |
| WO | 2009057192 | 5/2009 |

\* cited by examiner

Prior Art

FIG 1

Prior Art

TOOL FOR THE CHIPLESS PRODUCTION OR FINISHING OF A THREAD ON A WORKPIECE, IN PARTICULAR COLD-FORMING TAP OR THREAD-FORMING TAP

CROSS-REFERENCE TO RELATED APPLICATIONS

The present invention is a 35 U.S.C. §371 U.S. National Stage Application corresponding to PCT Application No. PCT/EP2012/073683, filed on Nov. 27, 2012, which claims priority to German Patent Application No. DE 10 2012 100 734.9, filed Jan. 30, 2012. The entire content of each of the aforementioned patent applications is incorporated herein by reference.

BACKGROUND OF THE INVENTION

1. Field of the Invention

The invention relates to a tool for the chipless production or finishing of a thread on a workpiece, in particular a cold-forming tap or a thread-forming tap.

2. Background

In these tools, the thread is produced without chip removal by means of forming of the workpiece, in that so-called pressing lands, also referred to as forming wedges or teeth, effect a cold forming of the workpiece by the use of pressure. The advantage of these tools is that, as a result of the deformation of the surface and the associated compaction, the hardness of the material increases in the region of the thread profile and thus a more wear-resistant thread than in chip-forming thread production is obtained.

Known cold-forming taps, in particular for internal thread production, comprise a shank and a working region. The shank is generally of cylindrical construction and is accommodated and held, by its end facing away from the workpiece, in the chuck of a thread-producing device. The working region, in particular the forming region, is located on that side of the cold-forming tap which lies opposite the shank.

The forming region is provided with a shaping curve which runs spirally around the periphery and along which the pressing lands are configured as elevations.

In known cold-forming taps, the separation angle between two pressing lands following one upon the other along the shaping curve is equally large for all pressing lands. An imaginary rectilinear connecting lines between the tips of the pressing lands along the shaping curve form in a projection onto a surface perpendicular to the tool axis, except for radial deviations, substantially a regular n-sided polygon, wherein n pressing lands per revolution of the shaping curve about the tool axis are provided. Every nth. pressing land is arranged along a straight line parallel to the tool axis, which pressing lands arranged along a straight line form a so-called pressing web.

BRIEF SUMMARY OF THE INVENTION

The object of the present invention is to define a novel tool for the chipless production of a thread, in particular a novel cold-forming tap or thread-forming tap.

This object is achieved by virtue of the features of claim 1. Advantageous embodiments and refinements are defined in the dependent claims.

The tool according to the invention comprises at least one forming region, which is rotatable or rotates about a tool axis, for the chipless production or finishing of the thread, in particular an internal thread. The forming region has a plurality of pressing lands, which project or protrude radially outward away from the tool axis, for the production or finishing of the thread by pressing of the pressing lands into the workpiece surface. The pressing lands are arranged successively along a shaping curve which runs substantially spirally (or helically) about the tool axis. The pitch of the shaping curve corresponds substantially to the pitch of the thread to be produced or finished.

According to the invention, it is provided that the separation angle between a first of the pressing lands and a second pressing land which follows this first pressing land along the shaping curve differs from the separation angle between the second pressing land and a third pressing land which follows the second pressing land along the shaping curve. The separation angle is here defined in a projection of the respective pressing lands into a plane perpendicular to the tool axis. The vertex of the separation angle between two pressing lands lies on the tool axis and its two arms pass through the tips of the two considered pressing lands, wherein by the tip of a pressing land is understood that point on the pressing land which has the greatest distance from the tool axis.

The advantages of the tool according to the invention lie in good rough-forming characteristics and high accuracy of the thread produced with this tool, since the tool is precisely guided through the inventive arrangement of the pressing lands in the machining of the workpiece.

One embodiment of the invention provides that two different separation angles between successive pressing lands alternate with each other along the shaping curve.

According to one refinement of the invention, the amount of the difference between the two different separation angles lies between 2° and 45°, in particular between 5° and 15°.

A further embodiment provides that at least three successive separation angles between pressing lands following one upon the other along the shaping curve differ, in particular by at least 2°, preferably by at least 5°.

A sequence of successive different separation angles between pressing lands following one upon the other along the shaping curve can also be continuously repeated along the shaping curve.

According to one variant of the invention, each revolution of the shaping curve about the tool axis has the same number n of pressing lands, and the respectively nth. pressing lands are arranged along the shaping curve in a plane which also contains the tool axis. The tips of the respectively nth. pressing lands thus lie on a straight line parallel to the tool axis, which pressing lands arranged along the straight line form a pressing web. Thus n pressing webs are distributed around the periphery of the tool, wherein the separation angles between the pressing webs correspond to the above-specified separation angles between their respective pressing lands. The correspondingly refined tool according to the invention can alternatively or additionally also be characterized in that the successive separation angles between the successive pressing lands of a revolution of the shaping curve about the tool axis form a sequence of separation angles which is continuously repeated along the shaping curve. Alternatively or additionally, a correspondingly refined tool according to the invention can also be defined by the fact that axially mutually adjacent pressing lands, except for radial deviations, are arranged on a straight line parallel to the tool axis and/or in a plane also containing the tool axis.

According to a further variant of the invention, the pressing lands can also however be distributed randomly along the shaping curve such that no repeating sequence of successive separation angles exists, wherein each separation angle lies between 2° and 178°, in particular between 10° and 170°, preferably between 20° and 120°. In this case, the tool has no pressing webs, as explained on the basis of the variant described above. This random distribution leads to an uneven distribution between the pressing lands on the periphery, without repetition of the arrangement from revolution to revolution of the shaping curve.

BRIEF DESCRIPTION OF THE DRAWINGS

The invention is explained in greater detail below, including with respect to further features and advantages, on the basis of the description of illustrative embodiments and with reference to the appended drawings, wherein.

Mutually corresponding parts and sizes are denoted in the figures with the same reference symbols.

DETAILED DESCRIPTION OF THE PREFERRED EMBODIMENTS

Figure 1:
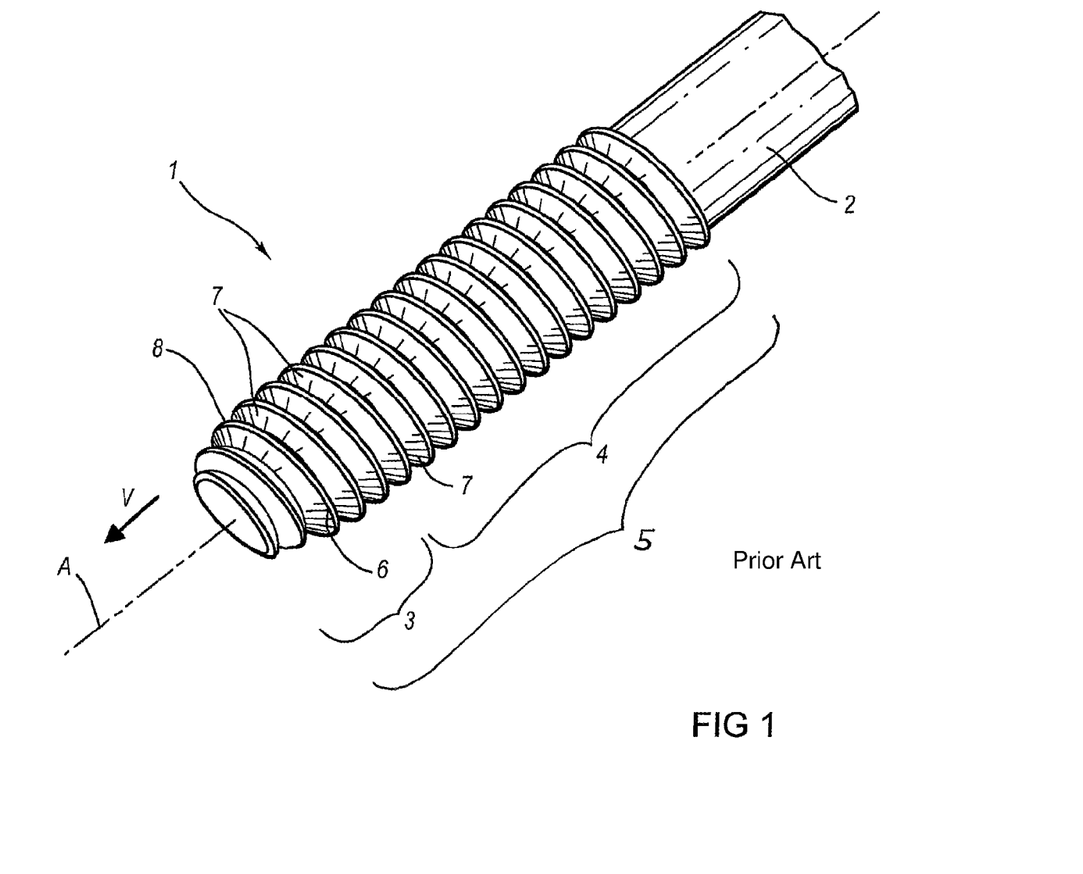
FIG. 1 shows a perspective view of a known cold-forming tap.

FIG. 1 shows a cold-forming tap 1 which is known per se and which comprises a tool shank 2 and two working regions, namely a shaping region 3 and a calibration region 4. The shaping region 3 and the calibration region 4 form a forming region 5 of the cold-forming tap 1. A tool axis A, which simultaneously constitutes a rotational axis of the cold-forming tap 1, runs parallel to the longitudinal extent of the cold-forming tap 1 through the middle of the cold-forming tap 1. A direction of feed V of the cold-forming tap 1 runs parallel to the tool axis A and is indicated in FIG. 1 by the arrow direction. The cold-forming tap 1 serves for the chipless creation of an internal thread.

The tool shank 2 can be, for instance, of cylindrical construction and generally bears, on the side inserted in the chuck, a square (not represented here) for the transmission of the tapping torque. The tool shank 2 is in this case fixedly connected to the adjacent forming region 5, in particular the tool shank 2 and the forming region 5 are constructed in one piece. In a projection onto a surface perpendicular to the tool axis A, the forming region 5 has a polygonal shape which possesses approximately the shape of a triangle with rounded corners and rounded connecting lines between the corners.

In the forming region 5, numerous pressing lands 7 are configured on a tool core, as the shaping thread, along a shaping curve 6. The shaping curve 6 runs spirally or helically, i.e. with pitch, about the tool axis A. The pressing lands 7 respectively have at their free outer end a tip 8 (also: head). The pressing lands 7 are arranged offset along the shaping curve 6 and thus, due to the pitch of the shaping curve 6, axially along the tool axis A.

In the case which is represented, each revolution, i.e. each winding, of the shaping curve 6 about the tool axis A comprises three pressing lands 7. All respectively third pressing lands 7 of the pressing lands 7 following directly one upon another along the shaping curve are arranged with their tip 8 in a plane which also contains the tool axis A. Instead of three pressing lands 7, cold-forming taps can in alternative embodiments also have several pressing lands 7 per thread turn, for instance four or five or six or seven or eight or nine or ten.

If the cold-forming tap 1 is now introduced in the direction of feed V into a bore, then the pressing lands 7 of the shaping region 3 form a thread in the internal wall of the bore. The pressing lands 7 following one upon another along the shaping curve 6 penetrate into the workpiece surface until a last pressing land 7 of the shaping region 3 forms the thread in its full depth and width. Upon further rotary movement of the cold-forming tap 1 in the direction of feed V, the following pressing lands 7 of the calibration region 4 calibrate and smooth the produced thread (the thread turns or thread grooves). In terms of their dimensions and shape, the pressing lands 7 in the calibration region 4 are therefore precisely tailored to the thread to be produced.

Figure 2:
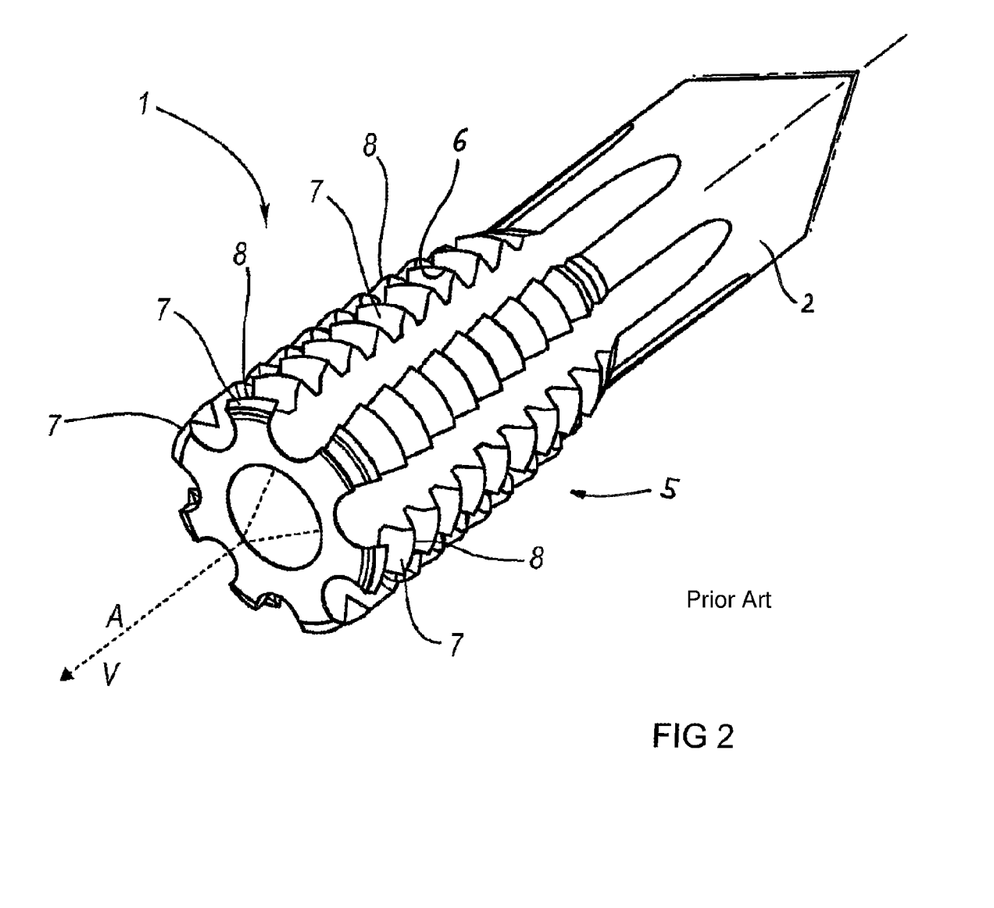
FIG. 2 shows a perspective view of another known cold-forming tap.

FIG. 2 shows schematically in perspective representation a part of another known illustrative embodiment of a cold-forming tap 1. The tool axis A and the direction of feed V are represented. Once again a forming region 5 has pressing lands 7, which are arranged along a shaping curve 6. The tips 8 of the pressing lands 7 can respectively be seen. In this illustrative embodiment, seven pressing lands per revolution of the shaping curve 6 are arranged about the tool axis A. In a projection onto a surface perpendicular to the tool axis A, imaginary rectilinear connecting lines between the tips 8 of the pressing lands 7 along the shaping curve 6 form, except for radial deviations in particular in respect of pressing lands 7 close to the tool tip, substantially a regular heptagon. The pressing lands 7 are arranged such that respectively every seventh pressing land 7 lies in a plane which also contains the tool axis A. In other words, the respectively seventh pressing lands 7, except for radial deviations, are arranged substantially along a line (straight line). In the case of a revolution around the tool 1 along the shaping curve 6, seven pressing lands 7 can be registered.

In the known cold-forming taps 1 shown in FIG. 1 and FIG. 2, the pressing lands are arranged distributed evenly around the periphery of the forming region 5, that is to say, in a projection onto a surface perpendicular to the tool axis A, imaginary rectilinear connecting lines between the tips 8 of the pressing lands 7 along the shaping curve 6 form substantially, except for radial deviations, a regular n-sided polygon, wherein n pressing lands per revolution of the shaping curve 6 about the tool axis A are provided. In other words: the separation angle between pressing lands which respectively follow one upon another along the shaping curve 6 is equally large for all pressing lands.

Herein lies the central difference from tools 1 according to the invention as are shown in FIG. 3 to FIG. 6. In these illustrative embodiments, the separation angle t1 between a first of the pressing lands 7a and a second pressing land 7b which follows this first pressing land 7a along the shaping curve 6 differs from the separation angle t2 between the second pressing land 7b and a third pressing land 7c which follows the second pressing land 7b along the shaping curve 6.

Figure 3:
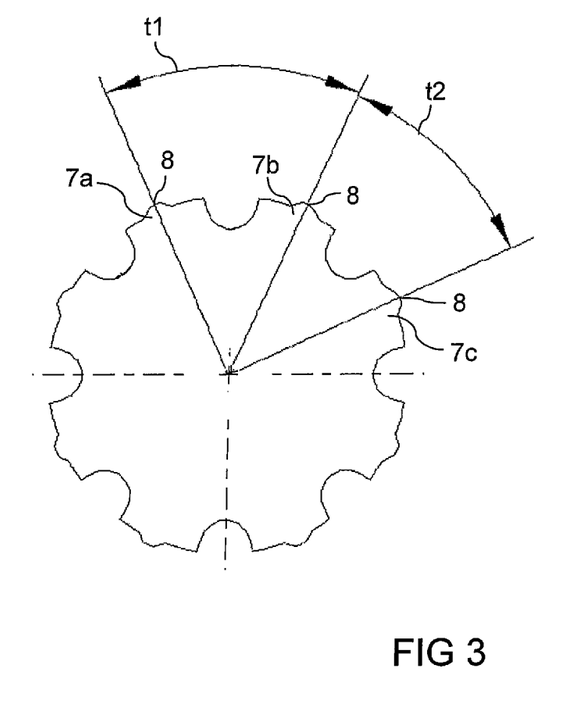
FIG. 3 shows a projection of an illustrative embodiment of a tool according to the invention in a plane perpendicular to the tool axis, in a direction of view counter to a direction of feed of the tool.

FIG. 3 illustrates this in a projective representation. The projection of an illustrative embodiment of a tool 1 according to the invention into a plane perpendicular to the tool axis is shown in the direction of view counter to a direction of feed of the tool. Three pressing lands 7a, 7b, 7c, which follow one upon the other along the shaping curve and the tip 8 of which is visible respectively as the farthest protruding radial elevation, can be seen. Between these tips 8, the separation angles t1 and t2 are represented, wherein the separation angle t1 between the tips 8 of the first pressing land 7*a* and of the second pressing land 7*b* is greater than the separation angle t2 between the tips 8 of the second pressing land 7*b* and of the third pressing land 7*c*. In the example shown in FIG. 3, the particular tool 1 has eight pressing lands per revolution of the shaping curve 6.

Figure 4:
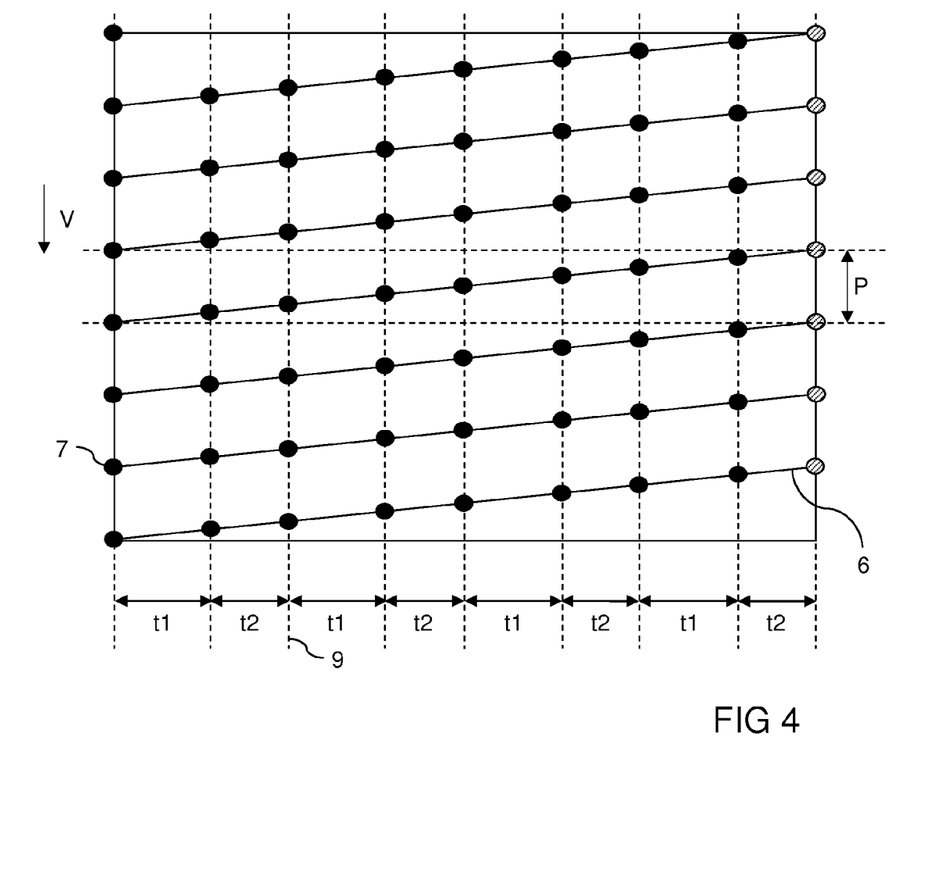
FIG. 4 to FIG. 6 show developed views of parts of the forming regions of various illustrative embodiments of tools according to the invention.
Figure 5:
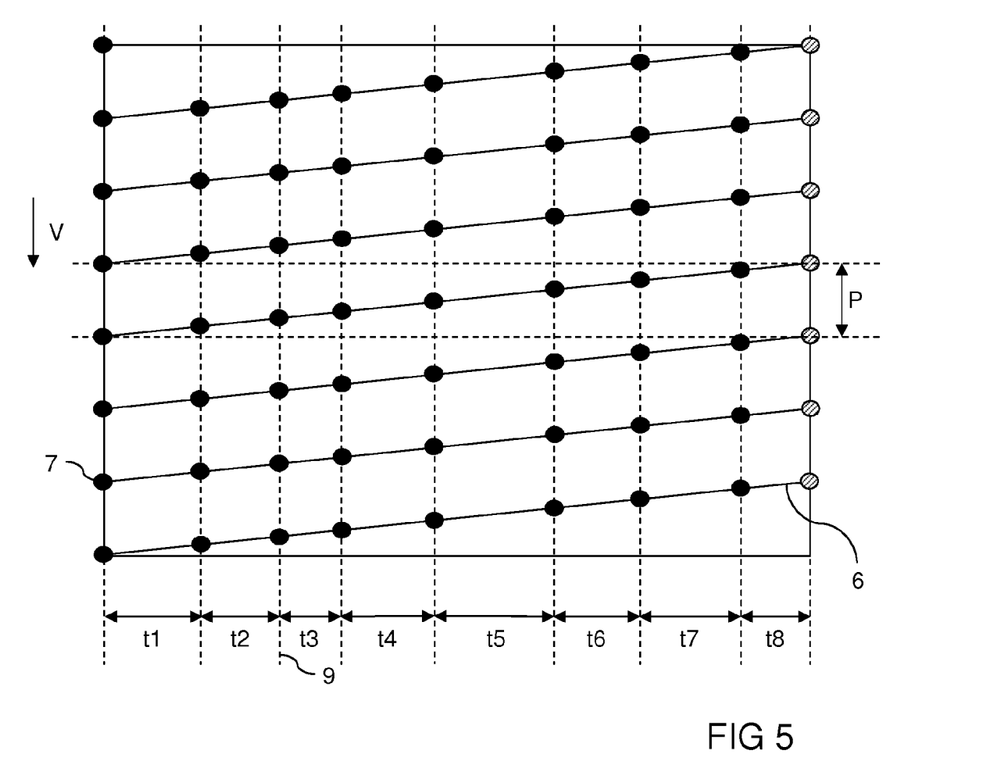
Figure 6:
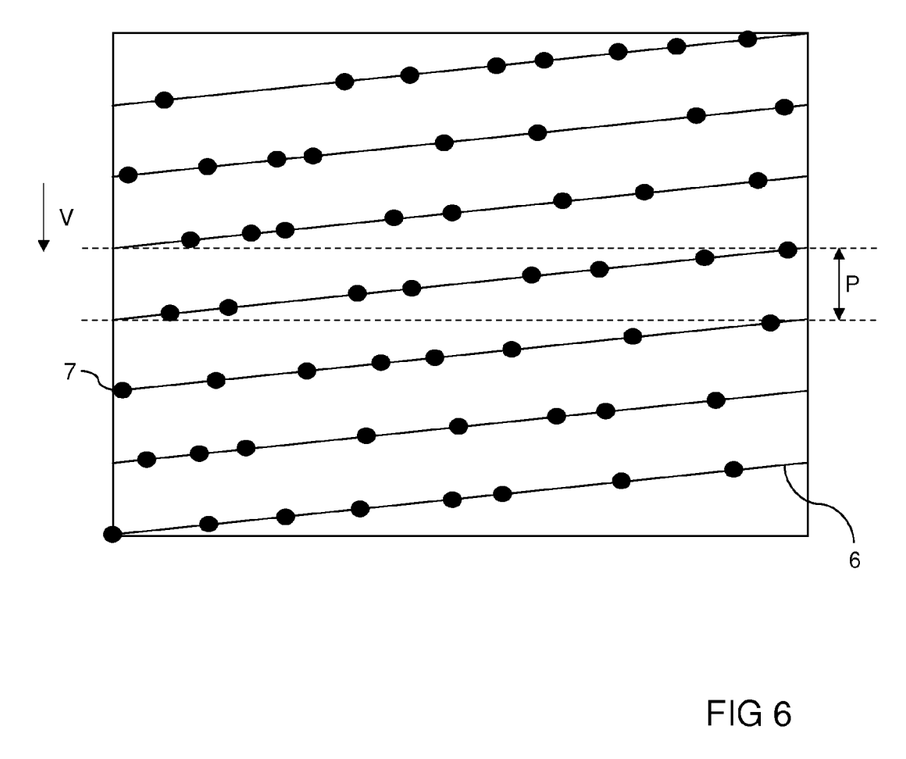

FIG. 4 to FIG. 6 illustrate the arrangement of the pressing lands 7 on the basis of developed representations of parts of the forming region of various illustrative embodiments of tools according to the invention. The separation angles t1, t2, . . . are schematically represented by double arrows. In order to illustrate the orientation of the developed representations, the direction of feed V of the tool is respectively recorded. The shaping curve 6, along which the pressing lands 7 are arranged, can respectively be seen. The thread pitch P of the shaping curve 6 is recorded in FIG. 4 to FIG. 6. In the developed representations, a line running from the left side of the representation to the right side of the representation corresponds to one revolution of the shaping curve about the tool axis A. Since, in FIG. 4 and FIG. 5, pressing lands 7 are arranged on the left margin of the represented developed view, these appear also on the right margin. In order to illustrate that this respectively relates to the pressing land already represented on the left margin, these pressing lands on the right margin are shown in hatched representation. It thus becomes clear that, in the illustrative embodiments shown in FIG. 4 and FIG. 5, eight pressing lands are provided per revolution of the shaping curve 6. Comparable embodiments having a lesser or a greater number of pressing lands are, of course, possible.

FIG. 4 shows an arrangement of pressing lands 7 along the shaping curve 6, in which two different separation angles t1 and t2 between successive pressing lands 7 alternate with each other along the shaping curve 6. The pressing lands 7 are arranged such that respectively every eighth pressing land 7 lies in a plane which also contains the tool axis A. In other words, the respectively eight pressing lands 7 are arranged substantially along a straight line 9. These lines or straight lines 9 are also referred to as pressing webs.

FIG. 5 shows an arrangement of pressing lands 7 along the shaping curve 6, in which all separation angles t1, t2, . . . , t8 between successive pressing lands 7 of a revolution of the shaping curve 6 about the tool axis A differ from one another. In the example according to FIG. 4, the pressing lands 7 are arranged, however, such that respectively every eighth pressing land 7 lies in a plane which also contains the tool axis A, that is to say that the respectively eighth pressing lands 7 are arranged substantially along a straight line 9 and thus as rectilinear pressing webs. Thus a sequence of successive different separation angles t1, t2, . . . , t8 between pressing lands 7 following one upon another along the shaping curve 6, which sequence is continuously repeated along the shaping curve 6, is obtained.

Unlike FIG. 4 and FIG. 5, FIG. 6 shows an illustrative embodiment in which the pressing lands 7 are distributed randomly along the shaping curve 6 such that no repetitive sequence of successive separation angles exists.

The pressing lands 7 are arranged—in accordance with certain boundary conditions—randomly along the shaping curve, the separation angles differ accordingly without the appearance of a systematic approach. A boundary condition, apparent in FIG. 6, with respect to the arrangement is, however, that an even as possible coverage of the periphery of the forming region shall be obtained in order to achieve an even distribution of the forces generated during forming and thus to ensure a rectilinear feed. In the represented example, the pressing lands are arranged such that, per revolution of the shaping curve 6, at least, say, eight plus/minus one pressing lands 7 are provided. This means that the separation angles lie within a predefined range, for instance between 10° and 170°. Unlike the examples according to FIG. 4 and FIG. 5, the pressing lands 7 form, in the example according to FIG. 6, no rectilinear pressing webs parallel to the tool axis A.

Of course, tool configurations analogous to the examples according to FIG. 4 to FIG. 6, including having a different number of pressing lands per revolution of the shaping curve about the tool axis, for instance having three or four or five or six or seven or nine or ten pressing lands per revolution, are possible. In addition, a radial offset of the pressing lands, in particular in the direction of the end face of the tool, can be provided.

LIST OF REFERENCES

1 material machining tool, cold-forming tap
2 tool shank
3 shaping region
4 calibration region
5 forming region
6 haping curve
7, 7*a*, 7*b*, 7*c* pressing lands
8 tip of the pressing land
9 straight line, pressing web
A tool axis
P thread pitch
t1, t2, . . . separation angle between pressing lands
V direction of feed

We claim:

1. A tool for the chipless production or finishing of a thread in or on a workpiece, the tool comprising:
   at least one forming region, which is rotatable or rotates about a tool axis, for the chipless production or finishing of a thread, wherein:
   the forming region has a plurality of pressing lands, the plurality of pressing lands including sets of adjacent pressing lands, the plurality of pressing lands project or protrude radially outward away from the tool axis, for the production or finishing of the thread by pressing of the pressing lands into the workpiece surface;
   the pressing lands are arranged successively along a shaping curve, wherein the shaping curve runs substantially spirally about the tool axis;
   a pitch of the shaping curve corresponds substantially to a pitch of the thread to be produced or finished;
   the pressing lands of each set of adjacent pressing lands along the shaping curve are separated from one another about the tool axis by a separation angle, wherein a first set of adjacent pressing lands includes a first pressing land and a second pressing land, the first pressing land and the second pressing land being separated about the tool axis by a first separation angle, wherein a second set of adjacent pressing lands includes the second pressing land and a third pressing land, the second pressing land and the third pressing land being separated about the took axis by a second separation angle, the first separation angle differing from the second separation angle; and
   the pressing lands are distributed randomly along the shaping curve about the tool axis such that no repeating sequence of separation angles exists between successive sets of adjacent pressing lands.

2. The tool as claimed in claim 1, wherein a difference between the separation angles of two sets of adjacent pressing lands lies between 2° and 45°.

3. The tool as claimed in claim 1, wherein the separation angles between at least three successive sets of adjacent pressing lands differ from one another.

4. The tool as claimed in claim 1, wherein each revolution of the shaping curve about the tool axis has a same number n of pressing lands, and an nth pressing land from each revolution is arranged along the shaping curve in a plane with the nth pressing lands of the other revolutions and the tool axis.

5. The tool as claimed in claim 1, wherein the plurality of pressing lands includes at least two axially mutually adjacent pressing lands that are radially offset from one another and are arranged on a straight line parallel to the tool axis and/or in a plane also containing the tool axis.

6. The tool as claimed in claim 1, wherein each separation angle lies between 2° and 178°.

7. The tool as claimed in claim 1, wherein each separation angle lies between 10° and 170°.

8. The tool as claimed in claim 1, wherein each separation angle lies between 20° and 120°.

9. The tool as claim in claim 1, wherein a difference between the separation angles of two sets of adjacent pressing lands lies between 5° and 15°.

10. The tool as claimed in claim 1, wherein the separation angles between at least three successive sets of adjacent pressing lands differ from one another by at least 2°.

11. The tool as claimed in claim 1, wherein the separation angles between at least three successive sets of adjacent pressing lands differ from one another by at least 5°.

* * * * *